No. 884,477. PATENTED APR. 14, 1908.
W. L. R. EMMET & E. D. DICKINSON.
SHAFT BEARING.
APPLICATION FILED AUG. 23, 1905.
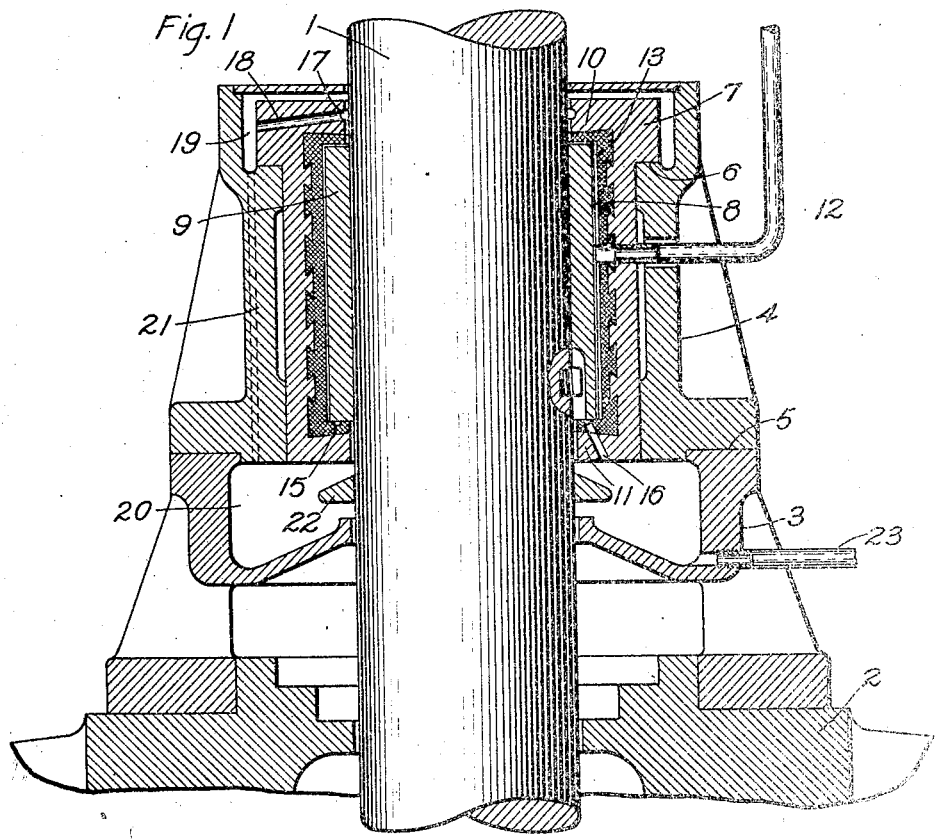
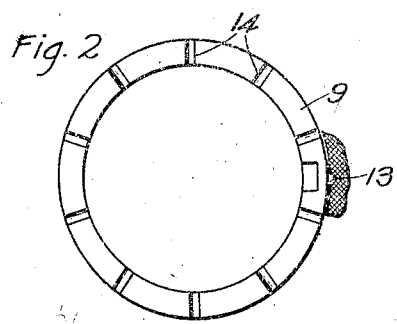
Witnesses:
Inventors:
William L. R. Emmet
Edgar D. Dickinson

UNITED STATES PATENT OFFICE.

WILLIAM L. R. EMMET AND EDGAR D. DICKINSON, OF SCHENECTADY, NEW YORK, ASSIGNORS TO GENERAL ELECTRIC COMPANY, A CORPORATION OF NEW YORK.

SHAFT-BEARING.

No. 884,477.  Specification of Letters Patent.  Patented April 14, 1908.

Application filed August 23, 1905. Serial No. 275,396.

*To all whom it may concern:*

Be it known that we, WILLIAM L. R. EMMET, a citizen of the United States, and EDGAR D. DICKINSON, a subject of the King of Great Britain, residing at Schenectady, county of Schenectady, State of New York, have invented certain new and useful Improvements in Shaft-Bearings, of which the following is a specification.

The present invention relates to bearings designed for use with shafts that are subject to vibration, such for instance as the shafts of turbines and similar high speed apparatus.

In bearings as usually constructed having small clearances, the shaft if subject to vibration is not capable of centering itself and the vibrations cause pounding on the bearing that has a peening action on the lining. This causes the bearings to wear away rapidly and heat, and also introduces lubrication troubles. Furthermore, the vibration is communicated to the stationary part of the machines, which is objectionable for various reasons. In the commutator type of dynamo-electric machines this vibration is particularly objectionable, as it causes sparking at the brushes and hence reduces the efficiency.

The object of this invention is to provide a bearing in which the objections referred to above are overcome.

In carrying out the invention, the shaft is provided with a suitable device that creates a hydraulic pressure which opposes the normal flow from the source of supply and by its action maintains an annular film of lubricant between the shaft and the bearing to dampen the vibrations of the former. A suitable arrangement for this comprises an enlargement on the shaft that is located within the bearing sleeve. This enlargement may in some cases be formed integral with the shaft, but in the preferred form of the invention it is separable therefrom and driven thereby. If the shaft is surrounded by a quill, the enlargement may be formed thereon or separable and driven thereby. We find it satisfactory and desirable to provide the shaft with a removable floating sleeve that is splined to the shaft and has a limited longitudinal movement thereon. This arrangement has the advantage that in event of overheating or wear, the shaft is uninjured while the sleeve may be renewed at small expense. Surrounding the sleeve and separated therefrom by a small clearance or space is a bearing or lining, babbitted or otherwise, having end flanges that embrace the end of the sleeve and which are separated therefrom by small clearances or spaces. A suitable source of supply is arranged to feed lubricant to the annular spaces or clearances between the sleeve and the bearing under a suitable head. As the sleeve rotates there is a centrifugal action set up by its end surfaces which creates a pressure sufficient to substantially balance that of the lubricant received from the source, and in this manner keep the space between the sleeve and bearing filled with lubricant.

It is to be understood that lubricant is continually flowing through the clearance between the periphery of the sleeve and the lining when the turbine is in operation, and that the pressures created at the ends of the sleeve serve to constantly maintain the annular film. It also serves to center the sleeve longitudinally within the lining. Under these conditons there is a hydraulic pressure created at one or both ends of the sleeve, which pressure serves to confine the lubricant to its proper place. In other words, the rotation of the sleeve causes an annular film of lubricant to be constantly maintained over its entire peripheral surface and also a film between the ends of the sleeve and the embracing flanges. Without this or some equivalent arrangement the lubricant has a tendency to be distributed unevenly over the surfaces and permits excessive vibration of the shaft. The film thus established insures an effective dash-pot action and permits of a comparatively large clearance between the relatively rotating parts. The advantages of this arrangement are very great when shafts are driven at high speeds and are consequently subject to vibration. This type of bearing is especially valuable for vertically disposed shafts, but it may also be used to advantage in many cases where the shafts occupy horizontal positions.

In some cases we find it desirable to provide small radial grooves in one or both ends of shaft-driven sleeves, since by so doing the pressure created thereby can be materially increased. Whether or not these grooves are employed will depend largely upon the conditions of operation of the machine.

In the following description, the invention will be described more in detail, while the novel features will be set forth in the claims appended hereto.

In the accompanying drawings, which illustrate one embodiment of the invention, Figure 1 is a central vertical section of a guide bearing of a vertical shaft turbine; and Fig. 2 is a bottom plan view of the shaft sleeve.

The construction shown is designed primarily for use in connection with elastic fluid turbines of the vertical shaft type, but it is to be understood that the invention is not limited to such use.

1 represents a portion of a vertical shaft extending through the head of the turbine represented at 2. The guide bearing is supported on a stool 3 that is seated on the head 2. It comprises a cylindrical casing 4 whose under-surface is shouldered at 5 to fit in and rest upon the upper annular end of the stool. The casing is preferably made in two or more sections divisible in an axial plane. The interior of the casing is cylindrically bored and provided with an internal shoulder 6, and fitting therein and resting on the shoulder is a shell 7 that is preferably lined with Babbitt metal 8 in any suitable manner. On the shaft is secured a sleeve 9 inclosed by the shell 7. The upper and lower ends of the shell are provided with flanges 10 and 11 which embrace the ends of the sleeve, the said flanges being also lined with babbitt. A clearance of suitable dimension is provided between the lining and the shaft sleeve so as to form the pocket for the film or body of lubricating fluid. It is sometimes necessary to adjust the shaft longitudinally, and in order to permit this to be done without affecting the relative positions of the sleeve and lining the former is splined to the shaft.

Lubricant is supplied from a suitable source, such as a gravity feed tank, by a conduit 12 that extends through an opening in the casing 4 and screws into the shell 7, where it discharges into a vertical groove 13 in the lining. The groove extends from end to end of the lining and forms a branched path for the fluid so that the latter can be fed throughout the length of the clearance. By experiment it has been determined that the best results are obtainable by locating the supply-conduit 12 nearer to the upper end of the bearing than to the lower, or at a point about two-thirds the height of the sleeve. By this arrangement the fluid supplied to the groove 13 is carried around with the rotation of the shaft and completely fills the clearance. The ends of the sleeve coöperating with the adjacent embracing flanges create pressures which prevent the flow of fluid from the ends of the bearings. The ends of the sleeves and the adjacent parts thus constitute devices which offer resistance to the free discharge of the fluid by setting up an opposing pressure at the ends of the annular clearance whereby a uniform unbroken column of fluid is maintained throughout the latter. The centrifugal action of the ends of the sleeve may be increased by providing radial grooves 14, as shown in Fig. 2. The action at the ends of the sleeve is not intended, however, to prevent the fluid from being discharged from the bearing; for this purpose drainage facilities are provided. Thus, in the lower annular flange 11 is provided an annular collecting groove or channel 15 which receives fluid from the lower end of the annular clearance and discharges it through one or more drainage passages 16. In the cylindrical wall of the upper annular flange 10 is a collecting groove 17 that collects any fluid which may be discharged from the upper end of the bearing and discharges it through one or more passages 18 into a chamber 19 formed between the casing and shell of the bearing. Below the bearing and preferably cast with the stool is a chamber 20 that serves as a basin to receive the drainage from both ends of the bearing. Passages 16 and 21 convey the lubricant thereto. In order to prevent any leakage of fluid from creeping down the shaft a deflector 22 is arranged on the shaft which deflects the fluid from the latter into the basin 20 by reason of centrifugal force. The fluid is conveyed away from the basin by the discharge-pipe 23. When the shaft is stationary the sleeve 9 rests at its lower end on the lower flange portion 11 of the bearing, as shown; but during rotation the sleeve becomes centered by reason of some of the fluid leaving the radial grooves and working in between the ungrooved portions of the sleeve and the adjacent wall of the bearing.

In accordance with the provisions of the patent statutes we have described the principle of operation of our invention, together with the apparatus which we now consider to represent the best embodiment thereof, but we desire to have it understood that the apparatus shown is only illustrative, and that the invention can be carried out by other means.

What we claim as new, and desire to secure by Letters Patent of the United States, is,—

1. The combination of a bearing, a means for supplying lubricant thereto, a shaft and means carried by said shaft which means by its rotary motion creates a hydraulic pressure that continuously maintains an annular cushioning film of lubricant between it and the bearing.

2. The combination of a bearing, a means for supplying lubricant thereto, a shaft and means carried by said shaft which means by its rotary motion distributes the lubricant in a film over the entire annular surface of the bearing, and at the same time creates a hydraulic pressure at one or both ends of the bearing which continuously maintains the annular film intact.

3. The combination of a bearing, a means for supplying lubricant thereto, a shaft and means carried by said shaft which means by its rotary motion creates a hydraulic pressure that continuously maintains an annular cushioning film of lubricant between it and the bearing and in addition thereto opposes the tendency of the lubricant to leak out around the ends of the bearing.

4. The combination of a bearing, a means for supplying lubricant thereto, a shaft, and a sleeve rotated by the shaft, one end of which creates a hydraulic pressure and maintains a body of lubricant between the peripheral surface of the sleeve and the bearing to dampen the vibrations of the shaft.

5. The combination of a bearing, a means for supplying lubricant thereto under a suitable head, a shaft, and a sleeve which is free to float longitudinally of the shaft and by its rotation to create a hydraulic pressure that constantly maintains an annular body of lubricant between the sleeve and bearing to dampen the vibrations of the shaft.

6. The combination of a shaft adapted to rotate at high speed, a cylindrical sleeve thereon having a smooth uninterrupted periphery, a bearing around the sleeve that is separated from its periphery by a clearance through which fluid is adapted to flow continuously, one or more devices arranged and adapted to resist the flow of fluid and cause the same to be evenly distributed throughout the clearance, and means for supplying fluid to the clearance for cushioning the shaft.

7. The combination of a vertical shaft adapted to rotate at high speed, a sleeve thereon, a bearing surrounding the sleeve and separated by a clearance and having portions that embrace the ends thereof, means for maintaining a body of fluid between the bearing and sleeve to cushion the shaft, and means at the lower end of the sleeve which creates a hydraulic pressure that assists in evenly distributing the fluid throughout the clearance.

8. The combination of a vertical shaft adapted to rotate at high speed, a sleeve thereon, a bearing surrounding the sleeve and separated by a clearance and having portions that embrace the ends thereof, a conduit supplying fluid to the clearance at a point nearer the top than the bottom of the bearing, and means at the lower end of the sleeve which acts upon the fluid in a manner to assist in evenly distributing it throughout the clearance.

9. The combination of a vertical shaft, a sleeve thereon having radial grooves in its lower end, a bearing around the sleeve that is separated therefrom by a clearance through which fluid is adapted to flow and discharge at both ends of the bearings, a wall adjacent to the grooved end of the sleeve which coöperates therewith to resist the flow of fluid from the lower end of the bearing and causes the fluid to be distributed throughout the clearance, and means for supplying fluid continuously to the clearance to lubricate the bearing surfaces and to cushion the vibrations of the shaft.

10. The combination of a vertical shaft, a sleeve thereon having radial grooves in its lower end, a bearing around the sleeve that is separated therefrom by a clearance through which fluid is adapted to flow and discharge at both ends of the bearings, a wall adjacent to the grooved end of the sleeve which coöperates therewith to resist the flow of fluid from the lower end of the bearing and causes the fluid to be distributed throughout the clearance, means for supplying fluid continuously to the clearance to lubricate the bearing surfaces and to reduce vibration of the shaft, and a collecting channel in the said wall from which fluid drains from the lower end of the bearing.

11. The combination of a vertical shaft, a sleeve thereon having radial grooves in its lower end, a bearing around the sleeve that is separated therefrom by a clearance through which fluid is adapted to flow and discharge at both ends of the bearings, a wall adjacent to the grooved end of the sleeve which coöperates therewith to resist the flow of fluid from the lower end of the bearing and causes the fluid to be distributed throughout the clearance, means for supplying fluid continuously to the clearance to lubricate the bearing surfaces and to reduce vibration of the shaft, a collecting channel in the said wall through which fluid drains from the lower end of the bearing, and means at the upper end of the bearing for conveying away the drainage therefrom.

12. The combination of a vertical shaft, a sleeve thereon having radial grooves in its lower end, a bearing around the sleeve that is separated therefrom by a clearance through which fluid is adapted to flow and discharge at both ends of the bearings, a wall adjacent to the grooved end of the sleeve which coöperates therewith to resist the flow of fluid from the lower end of the bearing and causes the fluid to be distributed throughout the clearance, means for supplying fluid continuously to the clearance to lubricate the bearing surfaces and to reduce vibration of the shaft, a collecting channel in the said wall through which fluid drains from the lower end of the bearing, means at the upper end of the bearing for conveying away the drainage therefrom, and a collecting basin below the bearing for receiving the fluid exhausted from both ends of the bearing.

In witness whereof we have hereunto set our hands this 18th day of August, 1905.

WILLIAM L. R. EMMET.
EDGAR D. DICKINSON.

Witnesses:
BENJAMIN B. HULL,
HELEN ORFORD.